(12) United States Patent
Hakamada et al.

(10) Patent No.: US 9,090,789 B2
(45) Date of Patent: Jul. 28, 2015

(54) AQUEOUS INK, INK JET RECORDING METHOD, INK CARTRIDGE AND INK JET RECORDING APPARATUS

(75) Inventors: Shinichi Hakamada, Kawasaki (JP); Yoichi Takada, Yokohama (JP); Yasuhiro Nito, Yokohama (JP); Masashi Tsujimura, Kawasaki (JP); Toshifumi Akasaka, Inagi (JP); Shinya Mishina, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 1832 days.

(21) Appl. No.: 11/958,980

(22) Filed: Dec. 18, 2007

(65) Prior Publication Data

US 2008/0152827 A1    Jun. 26, 2008

(30) Foreign Application Priority Data

Dec. 20, 2006  (JP) ................. 2006-342113

(51) Int. Cl.
*C09D 11/00* (2014.01)
*C09D 11/322* (2014.01)

(52) U.S. Cl.
CPC .................. *C09D 11/322* (2013.01)

(58) Field of Classification Search
CPC .... C09D 11/54; C09D 11/005; C09D 11/322; C09D 11/40; C09D 11/324; C09D 11/326
USPC ............................. 106/31.28, 31.6
See application file for complete search history.

(56) References Cited

U.S. PATENT DOCUMENTS

| | | | |
|---|---|---|---|
| 5,620,793 A | 4/1997 | Suzuki et al. | 428/342 |
| 5,734,403 A | 3/1998 | Suga et al. | 347/101 |
| 5,782,967 A | 7/1998 | Shirota et al. | 106/31.58 |
| 6,027,210 A | 2/2000 | Kurabayashi et al. | 347/100 |
| 6,036,307 A | 3/2000 | Hakamada et al. | 347/106 |
| 6,188,850 B1 | 2/2001 | Suzuki et al. | 399/1 |
| 6,214,963 B1 | 4/2001 | Noguchi et al. | 528/71 |
| 6,221,141 B1 | 4/2001 | Takada et al. | 106/31.6 |
| 6,238,045 B1 | 5/2001 | Ono et al. | 347/96 |
| 6,280,513 B1 | 8/2001 | Osumi et al. | 106/31.6 |
| 6,332,919 B2 | 12/2001 | Osumi et al. | 106/31.6 |
| 6,342,095 B1 | 1/2002 | Takizawa et al. | 106/31.27 |
| 6,375,317 B1 | 4/2002 | Osumi et al. | 347/100 |
| 6,398,355 B1 | 6/2002 | Shirota et al. | 347/100 |
| 6,425,662 B1 | 7/2002 | Teraoka et al. | 347/100 |
| 6,435,658 B1 | 8/2002 | Kato et al. | 347/43 |
| 6,474,803 B1 | 11/2002 | Shirota et al. | 347/100 |
| 6,474,804 B2 | 11/2002 | Osumi et al. | 347/100 |
| 6,506,239 B1 | 1/2003 | Osumi et al. | 106/31.27 |
| 6,511,534 B1 | 1/2003 | Mishina et al. | 106/31.33 |

(Continued)

FOREIGN PATENT DOCUMENTS

| | | | |
|---|---|---|---|
| EP | 0534634 | * 3/1993 | B41J 2/01 |
| JP | 3-240557 | 10/1991 | |

(Continued)

*Primary Examiner* — Shuangyi Abu Ali
(74) *Attorney, Agent, or Firm* — Fitzpatrick, Cella, Harper & Scinto

(57) ABSTRACT

An aqueous ink comprising water, a water-soluble organic solvent and at least two pigments. The aqueous ink is used together with a reaction liquid containing a reactive component that reacts with the aqueous ink to cause aggregation or gelation of the aqueous ink. The at least two pigments have a difference in precipitation value to the reaction liquid of 0.2 or less.

11 Claims, 3 Drawing Sheets

(56) References Cited

U.S. PATENT DOCUMENTS

| | | | |
|---|---|---|---|
| 6,521,034 B1 | 2/2003 | Osumi et al. | 106/31.6 |
| 6,530,656 B1 | 3/2003 | Teraoka et al. | 347/100 |
| 6,533,853 B1 | 3/2003 | Mishina et al. | 106/31.6 |
| 6,540,329 B1 | 4/2003 | Kaneko et al. | 347/43 |
| 6,547,381 B2 | 4/2003 | Watanabe et al. | 347/100 |
| 6,547,382 B1* | 4/2003 | Shirota et al. | 347/100 |
| 6,552,156 B2 | 4/2003 | Noguchi et al. | 528/71 |
| 6,572,692 B1 | 6/2003 | Osumi et al. | 106/31.6 |
| 6,582,070 B2 | 6/2003 | Takada et al. | 347/100 |
| 6,663,237 B2 | 12/2003 | Ishinaga et al. | 347/100 |
| 6,676,254 B2 | 1/2004 | Nagashima et al. | 347/100 |
| 6,698,876 B2 | 3/2004 | Sato et al. | 347/100 |
| 6,706,104 B2 | 3/2004 | Takuhara et al. | 106/31.6 |
| 6,706,105 B2 | 3/2004 | Takada et al. | 106/31.6 |
| 6,723,137 B1 | 4/2004 | Hakamada et al. | 8/549 |
| 6,848,781 B2 | 2/2005 | Ogino et al. | 347/105 |
| 6,874,881 B2 | 4/2005 | Suzuki et al. | 347/100 |
| 6,899,754 B2* | 5/2005 | Yeh et al. | 106/31.6 |
| 6,929,362 B2 | 8/2005 | Takada et al. | 347/100 |
| 6,932,465 B2 | 8/2005 | Nito et al. | 347/96 |
| 6,935,732 B2 | 8/2005 | Takada et al. | 347/96 |
| 6,976,755 B2 | 12/2005 | Sato et al. | 347/100 |
| 7,005,461 B2 | 2/2006 | Sanada et al. | 523/160 |
| 7,029,109 B2 | 4/2006 | Shirota et al. | 347/100 |
| 7,055,943 B2 | 6/2006 | Suzuki et al. | 347/100 |
| 7,141,105 B2 | 11/2006 | Udagawa et al. | 106/31.49 |
| 7,144,449 B2 | 12/2006 | Udagawa et al. | 106/31.15 |
| 7,185,978 B2 | 3/2007 | Nagashima et al. | 347/100 |
| 7,195,340 B2 | 3/2007 | Nagashima et al. | 347/56 |
| 7,208,032 B2 | 4/2007 | Hakamada et al. | 106/31.27 |
| 7,276,110 B2 | 10/2007 | Tsujimura et al. | 106/31.27 |
| 7,276,112 B2 | 10/2007 | Tokuda et al. | 106/31.6 |
| 7,291,214 B2 | 11/2007 | Tsuji et al. | 106/31.8 |
| 7,291,361 B2 | 11/2007 | Ogino et al. | 427/258 |
| 7,297,203 B2 | 11/2007 | Takada et al. | 106/31.8 |
| 7,347,890 B2 | 3/2008 | Nito et al. | 106/31.27 |
| 7,601,210 B2 | 10/2009 | Fujioka et al. | |
| 7,695,554 B2 | 4/2010 | Matsumoto et al. | |
| 7,806,970 B2 | 10/2010 | Fujioka et al. | |
| 2004/0077749 A1* | 4/2004 | Yatake | 523/160 |
| 2005/0204955 A1 | 9/2005 | Nagashima et al. | 106/31.59 |
| 2005/0219341 A1 | 10/2005 | Nito et al. | 347/100 |
| 2006/0007288 A1 | 1/2006 | Takada et al. | 347/100 |
| 2006/0007289 A1 | 1/2006 | Nito et al. | 347/100 |
| 2006/0087541 A1* | 4/2006 | Tsao | 347/100 |
| 2006/0089424 A1 | 4/2006 | Sanada et al. | 523/160 |
| 2006/0098067 A1 | 5/2006 | Imai et al. | 347/100 |
| 2006/0098068 A1 | 5/2006 | Hakamada et al. | 347/100 |
| 2006/0103704 A1 | 5/2006 | Hakamada et al. | 347/100 |
| 2006/0125895 A1 | 6/2006 | Nito et al. | 347/100 |
| 2007/0029522 A1 | 2/2007 | Udagawa et al. | 252/301.16 |
| 2007/0034114 A1 | 2/2007 | Udagawa et al. | 106/31.15 |
| 2007/0097155 A1 | 5/2007 | Imai et al. | 347/1 |
| 2007/0097156 A1 | 5/2007 | Udagawa et al. | 347/1 |
| 2007/0112095 A1 | 5/2007 | Moribe et al. | 523/160 |
| 2007/0134451 A1 | 6/2007 | Hakamada et al. | 428/32.38 |
| 2007/0188572 A1 | 8/2007 | Takayama et al. | 347/100 |
| 2007/0191508 A1 | 8/2007 | Nakagawa et al. | 523/160 |

FOREIGN PATENT DOCUMENTS

| | | |
|---|---|---|
| JP | 3-240558 | 10/1991 |
| JP | 5-202328 | 8/1993 |
| JP | 6-106735 | 4/1994 |
| JP | 2006-160814 A | 6/2006 |

* cited by examiner

AQUEOUS INK, INK JET RECORDING METHOD, INK CARTRIDGE AND INK JET RECORDING APPARATUS

BACKGROUND OF THE INVENTION

1. Field of the Invention

The present invention relates to an aqueous ink (hereinafter may also be referred to as "ink" merely) suitable for use in writing utensils such as aqueous ball point pens, fountain pens and aqueous marking pens, and particularly in ink jet printers, and to an ink jet recording method, an ink cartridge, and an ink jet recording apparatus.

2. Description of the Related Art

An ink jet recording system is a printing method in which minute droplets of an ink are ejected to apply the droplets to a recording medium such as paper, thereby conducting printing. According to this recording system, high-resolution and high-quality full-color images can be printed at a high speed by a cheap apparatus. However, the ink jet recording method has involved the following problems because the ink is liquid. More specifically, there has been a problem that when plain paper is used as a recording medium in particular, ink droplets permeate into the recording medium when the droplets have impacted on the recording medium, thereby causing an unclear contour part of an image. In addition, a phenomenon that boundary bleeding (i.e., color bleeding) occurs between adjoining different colors may have occurred in some cases.

On the other hand, in order to solve the above-described problems, a process in which a solution containing a polyvalent metal salt is applied to a recording medium and inks each containing a dye having at least one carboxyl group are then applied, has been proposed (see Japanese Patent Application Laid-Open No. H05-202328). In other words, according to this process, the solution containing a polyvalent metal ion (reaction liquid) comes into contact with the ink containing the dye capable of reacting with the ion on the recording medium, thereby forming insoluble matter. As a result, the unclearness at the contour part is improved, and the color bleeding is also prevented. In addition, a high-quality image with reduced strike-through of a coloring material to a back surface of the recording medium (hereinafter referred to as a strike-through characteristic) can be provided.

It has also been proposed to use a black ink having characteristics of thickening or aggregating by an action with a salt and a color ink containing the salt in combination. According to this proposal, a high-quality color image high in image density and free from occurrence of color bleeding is provided (see Japanese Patent Application Laid-Open No. H06-106735). In other words, according to this method, it is achieved to provide a good image by using, as a set, 2 liquids which reacts with each other when the liquids are mixed upon formation of the image (hereinafter referred to as a two liquid system). In addition, various proposals using 2 liquids have been made (see, for example, Japanese Patent Applications Laid-Open Nos. H03-240557 and H03-240558).

SUMMARY OF THE INVENTION

The present inventors have carried out various investigations as to a system in which a reaction liquid containing a reactive component and an ink reacting when mixed with the reaction liquid (two liquid system) are used to form an image. As a result, it has been found that the unclearness at the contour part is surely improved when the two liquid system is used, and a high-quality image can be formed without causing color bleeding even when a plurality of inks different in colors from each other are used. It has however been found that when an ink containing at least two pigments is used as an ink for forming an image, color unevenness of the image occurs at a portion on the recording medium where the applied ink amount is large. It has also been found that the ink may strike through to an unprinted surface (back surface) of the recording medium in some cases.

The present inventors have analyzed a main cause by which the above-described phenomena occur. As a result, it has been found that a difference in reactivity with respect to the reaction liquid between the pigments contained in the ink greatly participates in the phenomena. The cause by which the difference in reactivity with respect to the reaction liquid between the pigments contained in the ink causes the above-described phenomena is presumed to be as follows. More specifically, most of a pigment high in the reactivity with respect to the component in the reaction liquid remains on an upper portion of the recording medium. On the other hand, most of a pigment low in the reactivity with respect to the component in the reaction liquid permeates into the interior of the recording medium to form an aggregate at a lower portion of the recording medium though a part thereof remains on the upper portion. As a result, it is presumed that color unevenness occurs on the surface of the image or there is a portion where the ink strikes through to the unprinted surface of the recording medium.

Incidentally, such phenomena as described above have markedly occurred in the following cases: a case where an ink making combined use of pigments whose reactivity with respect to the component in the reaction liquid is extremely different from each other is used to form an image, and a case where the permeability of the ink is improved for the purpose of improving the fixing ability of a print by rapidly completing separation of a liquid component and a solid component after the ink comes into contact with the reaction liquid.

From the above, the present inventors have come to recognize, as a new object in the case where an ink containing a plurality of pigments is used in the two liquid system, an important object of controlling the reactivity of the respective pigments with respect to the reaction liquid within a certain value.

Accordingly, it is an object to provide an ink which can provide a clear contour part and is free from occurrence of color bleeding when an image is formed by the two liquid system. Another object is to provide an ink which is excellent in the strike-through characteristic and can form a high-quality image with reduced color unevenness. A further object is to provide an ink jet recording method, an ink cartridge and an ink jet recording apparatus using the ink.

The above objects can be achieved by the present invention described below.

Thus, the present invention provides an aqueous ink comprising water, a water-soluble organic solvent and at least two pigments which is used together with a reaction liquid containing a reactive component that reacts with the aqueous ink to cause aggregation or gelation of the aqueous ink, wherein the at least two pigments have a difference in precipitation value to the reaction liquid of 0.2 or less.

The present invention also provides an ink jet recording method comprising applying an aqueous ink and a reaction liquid to a recording medium to conduct recording, wherein the aqueous ink according to the present invention is used as the aqueous ink, and at least the application of the aqueous ink to the recording medium is conducted by an ink jet recording system.

The present invention further provides an ink cartridge storing the aqueous ink according to the present invention, and an ink jet recording apparatus comprising the above-described ink cartridge and an ink jet head for ejecting the aqueous ink.

Further features of the present invention will become apparent from the following description of exemplary embodiments with reference to the attached drawings.

DESCRIPTION OF THE EMBODIMENTS

Figure 1:
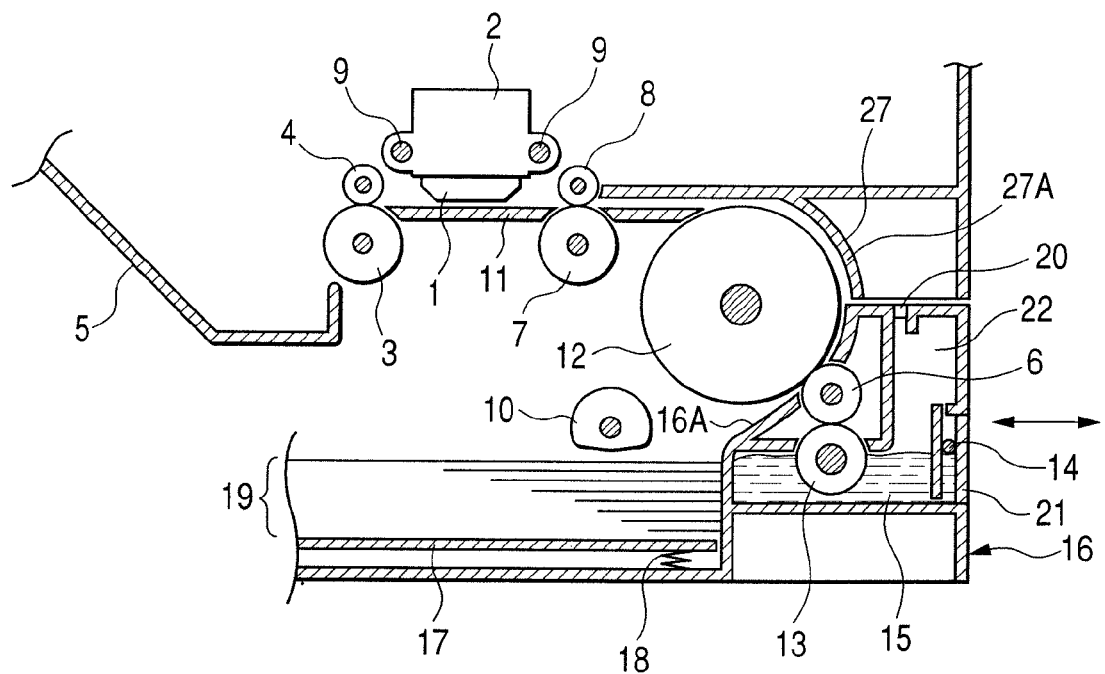
FIG. 1 is a schematic sectional side elevation of an exemplary ink jet recording apparatus according to the present invention.

Preferred embodiments of the present invention will now be described in detail in accordance with the accompanying drawings.

The present inventors have carried out an extensive investigation with a view toward solving the problems described above. As a result, it has been found that when an ink containing a plurality of pigments are used to form an image together with a reaction liquid, the objects of the present invention can be achieved by controlling within a certain value the reactivity of the respective pigments contained in the ink with respect to the reaction liquid.

In the present invention, the reactivity of the component in the reaction liquid with respect to the pigment can be determined by the following method. More specifically, to a container having an inner diameter of 10 mm and containing 5 g of the reaction liquid diluted to 1/100 by pure water, was added dropwise 0.25 g of a 3% aqueous solution of each pigment. After left in a stationary state for 60 minutes, the proportion of the height of a precipitate to the height from a bottom of the container to the air-liquid interface is calculated out. A lower calculated value obtained by the above-described method means that the reactivity of the component in the reaction liquid with respect to the pigment is higher. Incidentally, the calculated value is indicated as a precipitation value in the present invention. As a result of the investigation by the present inventors, it has been found that a difference in the precipitation value to the reaction liquid between the respective pigments is controlled to 0.2 or less, whereby color unevenness on an image formed and a place where a strike-through characteristic is partially poor are eliminated, thus leading to completion of the present invention.

As an example of a factor strongly exerting an influence on the difference in the precipitation value to the reaction liquid between the pigments, is mentioned a dispersant for stably dispersing the respective pigments (pigment dispersions) in a solution. Specifically, methods for controlling the difference in the precipitation value to the reaction liquid between the respective pigments to 0.2 or less include the following methods. In the case where the pigments are, for example, resin dispersion pigments in which the pigments are dispersed by resins, or microcapsule type pigments, there is a method in which a difference in acid value between the resins dispersing the pigments is controlled to 50 (mg KOH/g) or less. In the case where the pigments are self-dispersion type pigments in which the pigment are stably dispersed in a solution without using any dispersant, there is also a method in which a difference in surface functional group density between the pigments is controlled to 0.6 ($\mu$mol/m$^2$) or less.

As methods for measuring the surface functional group density, is mentioned a method in which a carbon black dispersion is purified, all counter ions are replaced by a sodium ion, and this sodium ion is measured by a probe type sodium ion electrode to convert the concentration of the sodium ion in the dispersion into 'ppm' per unit solid content. Incidentally, the conversion is conducted by assuming that a hydrophilic group such as a carboxyl group is present in the same number of moles as the sodium ion that is a counter ion.

According to an investigation by the present investigation, it has also been found that even when an ink having high permeability into a recording medium is used, color unevenness on the image and a strike-through characteristic are more improved by controlling the difference in the precipitation value to the reaction liquid between the respective pigments to 0.1 or less. It has further been found that when a plurality of pigments having no difference in the precipitation value to the reaction liquid are used, the effect thereof more markedly appears.

Incidentally, in the case where the pigments contained in the ink are resin dispersion pigments or microcapsule type pigments, specific methods for controlling the difference in the precipitation value to the reaction liquid between the respective pigments to 0.1 or less include a method in which the same dispersant is used as dispersants for the respective pigments. Incidentally, in the present invention, the condition that the same dispersant is used specifically means that the monomer components, monomer component ratios and the molecular weights of the resins making up the dispersants are made the same. In addition, in the case where self-dispersion type pigments are used as the pigments contained in the ink, there is a method in which the kinds and densities of the surface functional groups in the respective pigments are made the same. Further, the contents of the respective pigments based on the whole mass of the ink are favorably equal to each other regardless of the kinds of the pigments.

As a more favorable embodiment, the precipitation values of all pigments contained in the ink to the reaction liquid are favorably 0.5 or less. The reason for it is that a high-quality image, which is a fundamental object of the two liquid system, may not be obtained according to the kind of the recording medium and printing environments in some cases by setting the precipitation value to more than 0.5 though color unevenness is rapidly improved. On the other hand, the precipitation values of all pigments contained in the ink to the reaction liquid are favorably more than 0.3. The reason for it is that when a reaction liquid and an ink, for which the precipitation value is 0.3 or less, are used in combination to form an image, pigment aggregates are formed on the uppermost layer of the recording medium, so that scratch resistance and highlighter resistance may be impaired in some cases.

In the case where the reaction liquid contains divalent metal ions such as $Ca^{2+}$, $Cu^{2+}$, $Ni^{2+}$, $Mg^{2+}$, $Zn^{2+}$, $Sr^{2+}$ and $Ba^{2+}$, methods for setting the precipitation value of the pigment to the reaction liquid to more than 0.3 and 0.5 or less include a method in which the acid value of a resin which is a dispersant for the pigment is set to 250 or less. On the other hand, in the case where the reaction liquid contains trivalent metal ions such as $Al^{3+}$, $Fe^{3+}$, $Cr^{3+}$ and $Y^{3+}$, the methods include a method in which the acid value of a resin which is a dispersant for the pigment is set to 300 or less. The content of the polyvalent metal ions in the reaction liquid is controlled to favorably 1.0% by mass or more, and 6.0% by mass or less based on the whole mass of the reaction liquid, more favorably 2.0% by mass or more, and 4.5% by mass or less. However, the precipitation vale between the pigment and the reaction liquid is not determined by the properties of the pigment contained in the ink and the reactive component contained in the reaction liquid, but the contents of the respective components also greatly participate in the precipitation value. Accordingly, the above-described specific methods are only one means, and the methods are not limited thereto at all.

As a still more favorable embodiment, in the case where the difference in the precipitation value to the reaction liquid between the respective pigments contained in the aqueous ink is 0.2 or less, the content of a pigment having the highest precipitation value to the reaction liquid is favorably the lowest. More specifically, the content of the pigment having the highest precipitation value to the reaction liquid is favorably controlled to at most half the content of a pigment having the lowest precipitation value to the reaction liquid. The content of the pigment having the highest precipitation value is controlled lowest, whereby the color unevenness of the resulting image is improved, to say nothing of improvement in the strike-through characteristic. The reason why the color unevenness of the image is improved is considered to be attributable to the fact that the pigment having a low precipitation value occupies most of an image-forming area to become substantially inconspicuous. When the difference in the precipitation value between the respective pigments is more than 0.2, however, such an effect as described above is not achieved.

A reaction liquid and an ink making up an ink set (hereinafter also referred to as "ink set" merely) comprised of a combination of the ink according to the present invention and a reaction liquid will hereinafter be described.

[Reaction Liquid]

The reaction liquid used in the present invention contains a reactive component which reacts with at least two pigments in the ink to cause aggregation or gelation of the ink. Specifically, the reactive component is a component capable of destroying the dispersion stability of an ink having pigments stably dispersed or dissolved in an aqueous medium by an action of an ionic group when mixed with the ink on a recording medium. More specifically, the reactive component is at least one component selected from the group consisting of metal salts (particularly, polyvalent metal ions and salts thereof), low-molecular cationic compounds and cationic polymers. These reactive components will hereinafter be described.

(Metal Salt)

Specific examples of favorable polyvalent metal ions usable in the reaction liquid in the present invention include divalent metal ions such as $Ca^{2+}$, $Cu^{2+}$, $Ni^{2+}$, $Mg^{2+}$, $Zn^{2+}$, $Sr^{2+}$ and $Ba^{2+}$, and also include trivalent metal ions such as $Al^{3+}$, $Fe^{3+}$, $Cr^{3+}$ and $Y^{3+}$. However, the polyvalent metal ions are not limited thereto. In order to cause these polyvalent metal ions to be contained in the reaction liquid, polyvalent metal salts are used. The salt means a metal salt comprised of such a polyvalent metal ion as described above and an anion bonded to such an ion and is required to be soluble in water. Favorable examples of the anion for forming the salt include $Cl^-$, $NO_3^-$, $I^-$, $Br^-$, $ClO_3^-$, $SO_4^{2-}$, $CO_3^{2-}$, $CH_3COO^-$ and $HCOO^-$. However, the anions are not limited thereto.

$Ca^{2+}$, $Mg^{2+}$, $Sr^{2+}$, $Al^{3+}$ and $Y^{3+}$ are particularly favorable as the polyvalent metal ions from the viewpoints of reactivity, coloring ability and ease of handling. Among these, $Ca^{2+}$ is particularly favorable. $NO_3^-$ is particularly favorable as the anion from the viewpoint of solubility.

The reaction liquid favorably contains no pigment and is transparent, but is not always required not to exhibit absorption in a visible region. In other words, the reaction liquid may exhibit absorption in the visible region so far as the resulting image is substantially not affected.

(Low-Molecular Cationic Compound and Cationic Polymer)

The low-molecular cationic compound and cationic polymer used as the reactive component of the reaction liquid in the present invention are favorably soluble in water. Specific examples of the low-molecular cationic compound include the following compounds: primary, secondary or tertiary amine type hydrochlorides and acetates of laurylamine, coconut amine, stearylamine and rosin amine, and quaternary ammonium salt type lauryltrimethylammonium chloride, lauryldimethylbenzylammonium chloride, benzyltributylammonium chloride and benzalkonium chloride. In addition, pyridinium salt type cetylpyridinium chloride and cetylpyridinium bromide, imidazoline type 2-heptadecenylhydroxyethylimidazoline, and dihydroxyethylstearylamine, which is an ethylene oxide adduct of a higher alkylamine, may also be mentioned.

As specific examples of the cationic polymer, may be mentioned polyallyamine hydrochlorides, polyamine sulfonates, polyvinylamine hydrochlorides and chitosan acetates. In addition, copolymers of vinylpyrrolidone and aminoalkyl alkylate quaternary salt, and copolymers of acrylamide and aminomethylacrylamide quaternary salt, which are partially cationized products of nonionic polymers, may also be mentioned. Needless to say, the present invention is not limited these compounds. Taking the effect of the present invention into consideration, the content of the above-described compounds and polymers in the reaction liquid is favorably from 0.1% by mass or more to 20% by mass or less based on the whole mass of the reaction liquid.

The reaction liquid used in the present invention is favorably colorless, but is not always required not to exhibit absorption in a visible region. In other words, the reaction liquid may be light-colored and exhibit absorption in the visible region so far as the resulting image is substantially not affected when the image is formed.

(Aqueous Medium)

The reaction liquid used in the present invention is obtained by dissolving such a reactive component as described above in an aqueous medium. Examples of the aqueous medium include water and mixed solvents of water and a water-soluble organic solvent. The water-soluble organic solvent particularly favorably has an effect of preventing the drying of the resulting reaction liquid. Specific examples thereof include alkyl alcohols having 1 to 4 carbon atoms, such as methyl alcohol, ethyl alcohol, n-propyl alcohol, isopropyl alcohol, n-butyl alcohol, sec-butyl alcohol and tert-butyl alcohol; amides such as dimethylformamide and dimethylacetamide; ketones and ketone alcohols such as acetone and diacetone alcohol; ethers such as tetrahydrofuran and dioxane; polyalkylene glycols such as polyethylene glycol and polypropylene glycol; alkylene glycols the alkylene group of which has 2 to 6 carbon atoms, such as ethylene glycol, propylene glycol, butylene glycol, triethylene glycol, thiodiglycol, hexylene glycol and diethylene glycol; lower alkyl ether acetates such as polyethylene glycol monomethyl ether acetate; 1,2,6-hexanetriol; glycerol; lower alkyl ethers of polyhydric alcohols, such as ethylene glycol monomethyl (or monoethyl) ether, diethylene glycol methyl (or ethyl) ether and triethylene glycol monomethyl (or monoethyl) ether; polyhydric alcohols such as trimethylolpropane and trimethylolethane; N-methyl-2-pyrrolidone; 2-pyrrolidone; and 1,3-dimethyl-2-imidazolidinone. Such water-soluble organic solvents as described above may be used either singly or in any combination thereof. As the water, is desirably used deionized water.

No particular limitation is imposed on the content of the water-soluble organic solvents contained in the reaction liquid used in the present invention. However, the content is favorably 3% by mass or more, and 70% by mass or less, based on the whole mass of the reaction liquid. The content of water contained in the reaction liquid is favorably 25% by mass or more, and 95% by mass or less, based on the whole mass of the reaction liquid. Besides the above components, a surfactant, an antifoaming agent, a preservative, a mildew-proofing agent and the like may be suitably added to the reaction liquid used in the present invention, as needed, to provide it as a reaction liquid having desired physical property values.

The reactive component in the reaction liquid according to the present invention is favorably concentrated at a position somewhat deep from the uppermost layer of the recording medium. The reactive component is concentrated at the position somewhat deep from the uppermost layer of the recording medium, whereby aggregates of the respective pigments after the ink is applied locally present. As a result, the color unevenness can be more reduced.

Specific methods for concentrating the reactive component in the reactive liquid at the position somewhat deep from the uppermost layer of the recording medium include a method in which a small amount of the reaction liquid is rapidly caused to permeate into the recording medium. More specifically, the Ka value of the reaction liquid to a recording medium (plain paper: PPC Paper, product of Canon Inc.) determined by the Bristow's method is favorably 1.3 $mL \cdot m^{-2} \cdot msec^{-1/2}$ or more, more favorably 3.0 $mL \cdot m^{-2} \cdot msec^{-1/2}$ or more. The applied amount of the reaction liquid is favorably 0.5 $g/m^2$ or more, and 5.0 $g/m^2$ or less, more preferably 2.0 $g/m^2$ or more, and 3.0 $g/m^2$ or less.

[Ink]

The ink according to the present invention is an aqueous ink containing at least 2 pigments, wherein the difference in precipitation value to the reaction liquid between the respective pigments is 0.2 or less. Examples of pigments usable in the ink used in the present invention include resin dispersion pigments, microcapsule type pigments and self-dispersion type pigments.

<Pigment>

Examples of pigments usable in the present invention include carbon black and organic pigments. In the present invention, when a pigment is to be dispersed with an dispersant, the pigment and the dispersant are collectively regarded as 'pigment'.

(Carbon Black)

Examples of carbon black include carbon black pigments such as furnace black, lamp black, acetylene black and channel black. Examples of usable carbon black pigments include Raven 7000, Raven 5750, Raven 5250, Raven 5000, Raven 3500, Raven 2000, Raven 1500, Raven 1250, Raven 1200, Raven 1190 ULTRA-II, Raven 1170 and Raven 1255 (all, products of Columbian Carbon Co.); Black Pearls L, Regal 400R, Regal 330R, Regal 660R, Mogul L, Monarch 700, Monarch 800, Monarch 880, Monarch 900, Monarch 1000, Monarch 1100, Monarch 1300, Monarch 1400 and Valcan XC-72R (all, products of Cabot Co.); Color Black FW1, Color Black FW2, Color Black FW2V, Color Black FW18, Color Black FW200, Color Black S150, Color Black S160, Color Black S170, Printex 35, Printex U, Printex V, Printex 140U, Printex 140V, Special Black 6, Special Black 5, Special Black 4A and Special Black 4 (all, products of Degussa AG); and No. 25, No. 33, No. 40, No. 47, No. 52, No. 900, No. 2300, MCF-88, MA600, MA7, MA8 and MA100 (all, products of MITSUBISHI CHEMICAL CORPORATION). However, the present invention is not limited thereto, and any carbon black conventionally known may be used. Magnetic fine particles such as magnetite and ferrite, and titanium black may also be used as black pigments.

(Organic Pigment)

Specific examples of the organic pigments include the following pigments: insoluble azo pigments such as Toluidine Red, Toluidine Maroon, Hansa Yellow, Benzidine Yellow and Pyrazolone Red; soluble azo pigments such as Lithol Red, Helio Bordeaux, Pigment Scarlet and Permanent Red 2B; derivatives from vat dyes such as alizarin, indanthron and Thioindigo Maroon; phthalocyanine pigments such as Phthalocyanine Blue and Phthalocyanine Green; quinacridone pigments such as Quinacridone Red and Quinacridone Magenta; perylene pigments such as Perylene Red and Perylene Scarlet; isoindolinone pigments such as Isoindolinone Yellow and Isoindolinone Orange; imidazolone pigments such as Benzimidazolone Yellow, Benzimidazolone Orange and Benzimidazolone Red; pyranthrone pigments such as Pyranthrone Red and Pyranthrone Orange; thioindigo pigments; condensed azo pigments; and other pigments such as Flavanthrone Yellow, Acylamide Yellow, Quinophthalone Yellow, Nickel Azo Yellow, Copper Azomethine Yellow, Perinone Orange, Anthrone Orange, Dianthraquinonyl Red and Dioxazine Violet.

When organic pigments are indicated by COLOR INDEX (C.I.) numbers, the following pigments may be exemplified. C.I. Pigment Yellow 12, 13, 14, 17, 20, 24, 74, 83, 86, 93, 109, 110, 117, 120, 125, 128, 137, 138, 147, 148, 151, 153, 154, 166 and 168; C.I. Pigment Orange 16, 36, 43, 51, 55, 59 and 61; C.I. Pigment Red 9, 48, 49, 52, 53, 57, 97, 122, 123, 149, 168, 175, 176, 177, 180, 192, 215, 216, 217, 220, 223, 224, 226, 227, 228, 238 and 240; C.I. Pigment Violet 19, 23, 29, 30, 37, 40 and 50; C.I. Pigment Blue 15, 15:3, 15:1, 15:4, 15:6, 22, 60 and 64; C.I. Pigment Green 7 and 36; and C.I. Pigment Brown 23, 25 and 26. Needless to say, conventionally known organic pigments may also be used in addition to the above-described pigments.

(Dispersant)

When the above-described carbon black or organic pigments are used, a dispersant is favorably used in combination. A dispersant capable of stably dispersing the pigments in the aqueous medium by an action of an anionic group is favorably used as the dispersant. Specific examples of the dispersant include the following dispersants: styrene-acrylic acid copolymers, styrene-acrylic acid-alkyl acrylate terpolymers, styrene-maleic acid copolymers, styrene-maleic acid-alkyl acrylate terpolymers, styrene-methacrylic acid copolymers, styrene-methacrylic acid-alkyl acrylate terpolymers, styrene-maleic acid half ester copolymers, vinylnaphthalene-acrylic acid copolymers, vinylnaphthalene-maleic acid copolymers, styrene-maleic anhydride-maleic acid half ester terpolymers, and salts of these co- or terpolymers. These dispersants favorably have a weight average molecular weight of 1,000 or more, and 30,000 or less, more preferably 3,000 or more, and 15,000 or less.

<Self-Dispersion Type Pigment>

As the pigments, may also be used pigments, which can be dispersed in the aqueous medium without using any dispersant by bonding an ionic group (anionic group) to the surfaces thereof, i.e., the so-called self-dispersion type pigments. As an example of such pigments, may be mentioned self-dispersion type carbon black. As examples of the self-dispersion type carbon black, may be mentioned carbon black, to the surface of which any of the following anionic groups is bonded.

(Anionic Carbon Black)

Examples of the anionic carbon black include those obtained by bonding at least one anionic group selected from, for example, —COO(M2), —SO$_3$(M2), —PO$_3$H(M2) and —PO$_3$(M2)$_2$ to the surface of carbon black. In the formulae, M2 is a hydrogen atom, alkali metal, ammonium or organic ammonium. Among these, carbon black anionically charged by bonding —COO(M2) or —SO$_3$(M2) to the surface thereof is particularly favorably used in the present invention because of its good dispersibility in the ink. Of those represented by "M2" in the above-described anionic groups, specific examples of the alkali metal include Li, Na, K, Rb and Cs.

Specific examples of the organic ammonium include methylammonium, dimethylammonium, trimethylammonium, ethylammonium, diethylammonium, triethylammonium, methanol ammonium, dimethanol ammonium and trimethanol ammonium. An ink containing self-dispersion type carbon black, in which M2 is ammonium or organic ammonium, can more improve the water fastness of an image recorded with the ink. Thus, such an ink may be particularly favorably used in this respect. This is considered to attributable to the feature that when the ink is applied to a recording medium, the ammonium is decomposed to evaporate ammonia, thereby exerting an influence.

The self-dispersion type carbon black, in which M2 is ammonium, is obtained by, for example, replacing M2 in self-dispersion type carbon black, in which M2 is an alkali metal, by ammonium using an ion-exchange method. In addition, such carbon black is obtained by adding an acid to the self-dispersion type carbon black to convert it into an H type and then adding ammonium hydroxide to replace M2 by ammonium. An example of processes for preparing anionically charged self-dispersion type carbon black, may be mentioned a process in which carbon black is subjected to an oxidation treatment with sodium hypochlorite. According to this process, a —COONa group can be chemically bonded to the surface of carbon black.

Such various anionic groups as described above may be bonded directly to the surface of carbon black. Alternatively, another group may be caused to intervene between the surface of carbon black and the anionic group to bond the anionic group indirectly to the surface of carbon black. Specific examples of said another group include linear or branched alkylene groups having 1 to 12 carbon atoms, a substituted or unsubstituted phenylene group and a substituted or unsubstituted naphthylene group. Examples of substituent groups on the phenylene and naphthylene groups include linear or branched alkyl groups having 1 to 6 carbon atoms. Specific examples of combinations of said another group and the anionic group include —C$_2$H$_4$COO(M2), -Ph-SO$_3$(M2) and -Ph-COO(M2), wherein Ph is a phenyl group.

By the way, two or more of the self-dispersion type carbon black pigments described above may be suitably selected and used as pigments for the ink. The amount of the self-dispersion type carbon black pigments added to the ink is favorably 0.1% by mass or more, and 15% by mass or less, more favorably 1% by mass or more, and 10% by mass or less, based on the whole mass of the ink. The self-dispersion type carbon black can retain its satisfactory dispersed state in the ink by satisfying these conditions. Further, a dye may be added in addition to the self-dispersion type carbon black for the purpose of, for example, adjusting the color tone of the resulting ink.

<Colored Fine Particles/Microcapsule Type Pigment>

Besides the above-described pigments, pigments enmicrocapsulated with a polymer and colored fine particles obtained by coating resin particles with a pigment may also be used. Although the microcapsules naturally have dispersibility in the aqueous medium, such a dispersant as described above may be caused to additionally coexist in the ink for the purpose of enhancing dispersion stability. When the colored fine particles are used as a pigment, the above-described anionic dispersant is favorably used.

<Aqueous Medium>

No particular limitation is imposed on an aqueous medium for dispersing such pigments as described above therein to provide an ink, and the same aqueous medium as the aqueous medium used in the reaction liquid may be used. When the resulting color ink is applied to a recording medium by an ink jet method (for example, Bubble-Jet (trademark) method), the ink may favorably be prepared so as to have a desired viscosity and a surface tension for the purpose of achieving excellent ink-jet ejection properties.

Examples of the aqueous medium used in the ink include water and mixed solvents of water and a water-soluble organic solvent. The water-soluble organic solvent particularly favorably has an effect of preventing the drying of the resulting ink. Specific examples thereof include alkyl alcohols having 1 to 4 carbon atoms, such as methyl alcohol, ethyl alcohol, n-propyl alcohol, isopropyl alcohol, n-butyl alcohol, sec-butyl alcohol and tert-butyl alcohol; amides such as dimethylformamide and dimethylacetamide; ketones and ketone alcohols such as acetone and diacetone alcohol; ethers such as tetrahydrofuran and dioxane; polyalkylene glycols such as polyethylene glycol and polypropylene glycol; alkylene glycols the alkylene group of which has 2 to 6 carbon atoms, such as ethylene glycol, propylene glycol, butylene glycol, triethylene glycol, thiodiglycol, hexylene glycol and diethylene glycol; lower alkyl ether acetates such as polyethylene glycol monomethyl ether acetate; 1,2,6-hexanetriol; glycerol; lower alkyl ethers of polyhydric alcohols, such as ethylene glycol monomethyl (or monoethyl) ether, diethylene glycol methyl (or ethyl) ether and triethylene glycol monomethyl (or monoethyl) ether; polyhydric alcohols such as trimethylolpropane and trimethylolethane; N-methyl-2-pyrrolidone; 2-pyrrolidone; and 1,3-dimethyl-2-imidazolidinone. Such water-soluble organic solvents as described above may be used either singly or in any combination thereof. As the water, is desirably used deionized water.

No particular limitation is imposed on the content of the water-soluble organic solvents contained in the ink used in the present invention. However, the content is favorably 3% by mass or more and 50% by mass or less based on the whole mass of the ink. The content of water contained in the ink is favorably 50% by mass or more and 95% by mass or less based on the whole mass of the ink.

Besides the above components, a surfactant, an antifoaming agent, a preservative, a mildewproofing agent and the like, to say nothing of a humectant, may be suitably added to the ink used in the present invention, as needed, to provide it as an ink having desired physical property values.

A dye may also be used in the ink used in the present invention in addition to the above-described components.

<Dye>

As the dye used in the ink used in the present invention, may be used a conventionally known dye. For example, an acid dye, direct dye or disperse dye may be used. As, for example, anionic dyes, most of the already known and newly synthesized dyes may be used so far as such dyes have proper color tone and density. Some of these dyes may also by used in combination. Specific examples of the anionic dyes include the following dyes:

(Dye for Yellow)

C.I. Direct Yellow 8, 11, 12, 27, 28, 33, 39, 44, 50, 58, 85, 86, 87, 88, 89, 98, 100 and 110; C.I. Acid Yellow 1, 3, 7, 11, 17, 23, 25, 29, 36, 38, 40, 42, 44, 76, 98 and 99; C.I. Reactive Yellow 2, 3, 17, 25, 37 and 42; and C.I. Food Yellow 3.

(Dye for Red)

C.I. Direct Red 2, 4, 9, 11, 20, 23, 24, 31, 39, 46, 62, 75, 79, 80, 83, 89, 95, 197, 201, 218, 220, 224, 225, 226, 227, 228, 229 and 230; C.I. Acid Red 6, 8, 9, 13, 14, 18, 26, 27, 32, 35, 42, 51, 52, 80, 83, 87, 89, 92, 106, 114, 115, 133, 134, 145, 158, 198, 249, 265 and 289; C.I. Reactive Red 7, 12, 13, 15, 17, 20, 23, 24, 31, 42, 45, 46 and 59; and C.I. Food Red 87, 92 and 94.

(Dye for Blue)

C.I. Direct Blue 1, 15, 22, 25, 41, 76, 77, 80, 86, 90, 98, 106, 108, 120, 158, 163, 168, 199 and 226; C.I. Acid Blue 1, 7, 9, 15, 22, 23, 25, 29, 40, 43, 59, 62, 74, 78, 80, 90, 100, 102, 104, 117, 127, 138, 158 and 161; and C.I. Reactive Blue 4, 5, 7, 13, 14, 15, 18, 19, 21, 26, 27, 29, 32, 38, 40, 44 and 100.

(Dye for Black)

C.I. Direct Black 17, 19, 22, 31, 32, 51, 62, 71, 74, 112, 113, 154, 168 and 195; C.I. Acid Black 2, 48, 51, 52, 110, 115 and 156; and C.I. Food Black 1 and 2.

[Recording Method and Apparatus]

The reaction liquid according to the present invention is used in formation of an image in combination with an ink to be unstabilized by the reaction liquid. As a recording method at that time, a recording method in which at least recording by the ink is conducted by an ink jet recording system is favorable. More specifically, the recording method has a step of applying the reaction liquid to at least a region of a recording medium to which the ink is to be applied, prior to the application of the ink, and a step of applying the ink to the recording medium by the ink jet recording system. The reaction liquid according to the present invention causes the ink to aggregate or gel on the recording medium, thereby stably providing a high-quality image free from occurrence of color bleeding in particular. In addition, a high-quality image with reduced strike-through of the pigments to the unprinted back surface of the recording medium can be stably provided.

Examples of the method for applying the reaction liquid according to the present invention to the recording medium include a method of using an ink jet recording system similarly to the ink and a method of applying the reaction liquid according to the present invention to the recording medium by a roller. Among these methods, the application by the roller is favorable because this method does not need to take ejection stability into consideration.

The amount of the reaction liquid applied to the recording medium may be suitably controlled according to the kind and amount of the polyvalent metal ion in the reaction liquid and the ink to be reacted with the reaction liquid. The amount of the reaction liquid applied is favorably controlled to 0.5 $g/m^2$ or more and 10 $g/m^2$ or less from the viewpoints of solid evenness of an image and fixing ability in the resulting recorded article, and more favorably 2 $g/m^2$ or more and 5 $g/m^2$ or less.

(Ink Jet Recording Apparatus)

FIG. 1 illustrates an exemplary ink jet recording apparatus. This ink jet recording apparatus uses a serial type ink jet recording system. The ink jet recording apparatus has a recording head 1 and a paper feed cassette 16, in which a paper feed tray 17 for feeding a recording medium (hereinafter also referred to as "recording paper") 19 and a unit for applying the reaction liquid according to the present invention are integrally formed. The ink jet recording apparatus additionally has a driving unit for reciprocatingly moving the recording head in a direction perpendicular to a conveying direction of the recording paper, and a control unit for controlling the drive of these components.

The recording head 1 is mounted on a carriage 2 in such a manner that a surface on which ink-ejecting openings have been formed is oriented on the side of a platen 11. The recording head 1 has the ink-ejecting openings, a plurality of electrothermal converters (for example, heating resistors) for heating an ink and a substrate supporting the electrothermal converters though they are not illustrated. Incidentally, the recording head 1 is equipped with an ink cartridge within the carriage 2 provided at an upper part thereof.

The carriage 2 mounts the recording head 1 and can be reciprocatingly moved along 2 guide shafts 9 extending in parallel along a width direction of the recording paper 19. The recording head 1 is driven in synchronism with the reciprocating motion of this carriage to eject ink droplets to the recording paper 19, thereby forming an image. The paper feed cassette 16 can be detachably installed in the body of the ink jet recording apparatus. The recording paper 19 is stacked on the paper feed tray 17 within the paper feed cassette 16 and stored therein. Upon feeding of the paper, a paper sheet located at the uppermost position is pressed against a feed roller 10 by a spring 18 pressing the paper feed tray 17 upward. The feed roller 10 is a roller having a sectional form of a substantially half-moon and driven and rotated by a motor (not illustrated) to feed only the sheet (recording paper 19) located at the uppermost position by a separating claw (not illustrated).

The recording paper 19 separated and fed is conveyed along a conveying surface 16A of the paper feed cassette 16 and a conveying surface 27A of a paper guide 27 by a large-diameter intermediate roller 12 and a small-diameter coating roller 6 brought into contact under pressure with the intermediate roller. These conveying surfaces are formed of a surface curved so as to draw an arc concentric with the intermediate roller 12. Accordingly, the conveying direction of the recording paper 19 is reversed by being passed through these conveying surfaces 16A and 27A. In other words, the surface of the recording paper 19, on which printing will be conducted, is turned downward until the paper is conveyed from the paper feed tray 17 and reaches the intermediate roller 12, but turned upward (on the side of the recording head) at the point of time the paper faces the recording head 1. Accordingly, the printing surface of the recording paper is always directed toward an outside direction of the ink jet recording apparatus.

A unit for applying the reaction liquid is provided within the paper feed cassette 16 and has a supply tank 22 for supplying the reaction liquid 15 and a supply roller 13 rotatably supported in such a state that a part of its peripheral surface has been immersed in the tank 22. The unit for applying the reaction liquid additionally has the coating roller 6 arranged in parallel with the supply roller and coming into contact with the intermediate roller 12 to be rotated in the same direction. The coating roller 6 is arranged in such a manner that its peripheral surface comes into contact and parallel with the intermediate roller 12 for conveying the recording paper 19.

Accordingly, the supply roller 13 and coating roller 6 are rotated with the rotation of the intermediate roller 12 upon the conveyance of the recording paper 19. As a result, the reaction liquid 15 is supplied to the peripheral surface of the coating roller 6 by the supply roller 13, and further applied by the coating roller 6 throughout to the printing surface of the recording paper 19 pinched between the coating roller 6 and the intermediate roller 12.

In this ink jet recording apparatus, a float 14 is provided within the supply tank 22. This float 14 is formed of a substance lighter than the specific gravity of the reaction liquid 15, so that the float floats on the level of the reaction liquid, whereby the remaining reaction liquid can be visually confirmed from the outside through a remaining-amount-displaying window 21 that is a transparent member.

Figure 2:
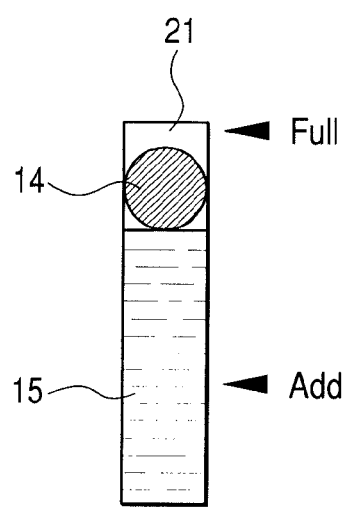
FIG. 2 is a sectional front elevation of a reaction liquid residue-displaying part provided in the ink-jet recording apparatus shown in FIG. 1.

FIG. 2 illustrates a remaining-amount-displaying part viewed from the front. In the remaining-amount-displaying part, an indication indicating the degree of the remaining amount is provided along a longitudinal direction of the remaining-amount-displaying window 21. In the drawing, the case where the level of the reaction liquid or the float 14 reaches a position indicated by "Full" indicates a state that the reaction liquid has been fully supplied. On the other hand, the case where the level of the reaction liquid or the float 14 is located at a position indicated by "Add" indicates that the reaction liquid is running short. Accordingly, it is quite obvious that it is only necessary to supply the reaction liquid when the reaction liquid 15 is gradually reduced, and the float 14 is lowered to the line of Add.

Figure 3:
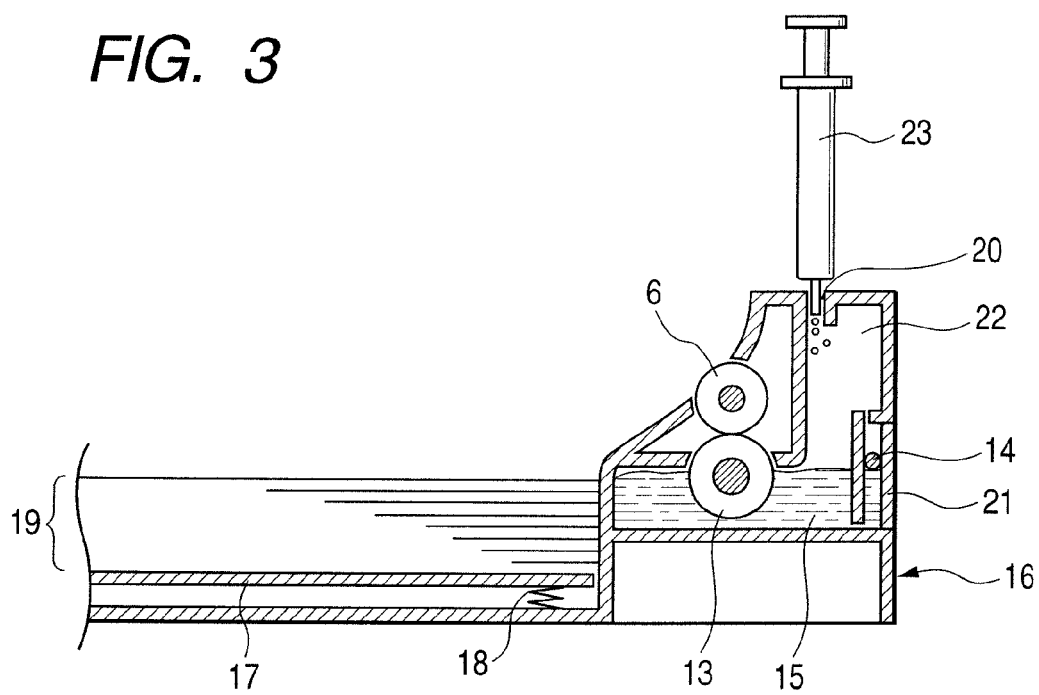
FIG. 3 is a schematic sectional side elevation illustrating a state that a reaction liquid has been supplied to the ink-jet recording apparatus shown in FIG. 1.

Concerning a method for supplying the reaction liquid, as illustrated in FIG. 3, the tip of an injector 23 is inserted into an inlet port 20 formed of a rubber member having a slit in such a state that the paper feed cassette 16 has been pulled out of the body of the ink jet recording apparatus, thereby injecting the reaction liquid in the supply tank 22.

The recording paper coated with the reaction liquid in such a manner is then carried by a prescribed quantity by a main conveying roller 7 and a pinch roller 8 brought into contact under pressure with this roller to be conveyed to a recording part, thereby applying an ink from the recording head 1. The recording medium 19 subjected to paper feeding and printing in the constitution described above is discharged by a paper-discharging roller 3 and a spur 4 brought into contact under pressure with this roller and stacked on a paper discharge tray 5.

When the reaction liquid is applied by the roller, it is favorable that the viscosity of the reaction liquid is set higher than the viscosity of the ink, because the ink can be effectively unstabilized by applying a smaller amount of the reaction liquid and fixing ability of a resulting recorded article is also more improved. More specifically, when the viscosity of the reaction liquid is higher, the polyvalent metal ion is easier to stay at an upper portion of the recording medium, so that the reaction liquid is easy to effectively react with the ink.

On the other hand, after the ink reacts with the reaction liquid, it is favorable that the pigment component in the ink stays at the upper portion of the recording medium, and the solvent and water rapidly permeate into the recording medium, namely, solid-liquid separation is rapidly conducted. Therefore, the viscosity of the ink is favorably low from the viewpoint of fixing ability. The viscosity of the reaction liquid when the reaction liquid is applied by the roller is favorably 3 mPa·s or more, and 100 mPa·s or less, more favorably 5 mPa·s or more, and 60 mPa·s or less. In the present invention, the viscosities of the reaction liquid and ink can be measured at a temperature of 25° C. by a method known per se in the art.

When both ink and reaction liquid making up the ink set according to the present invention are applied to a recording medium by an ink jet recording system, various methods such as the following methods are considered for the order of the application to the recording medium. Any of the following methods a) to d) may be used and suitably selected:
a) applying the ink after the reaction liquid is applied
b) applying the reaction liquid after the ink is applied
c) applying the reaction liquid after the ink is applied, and additionally applying the ink
d) applying the ink after the reaction liquid is applied, and additionally applying the reaction liquid.

In view of the objects of the present invention, the methods a) and d) at least including a step of applying the reaction liquid prior to the application of the ink are favorable.

Figure 4:
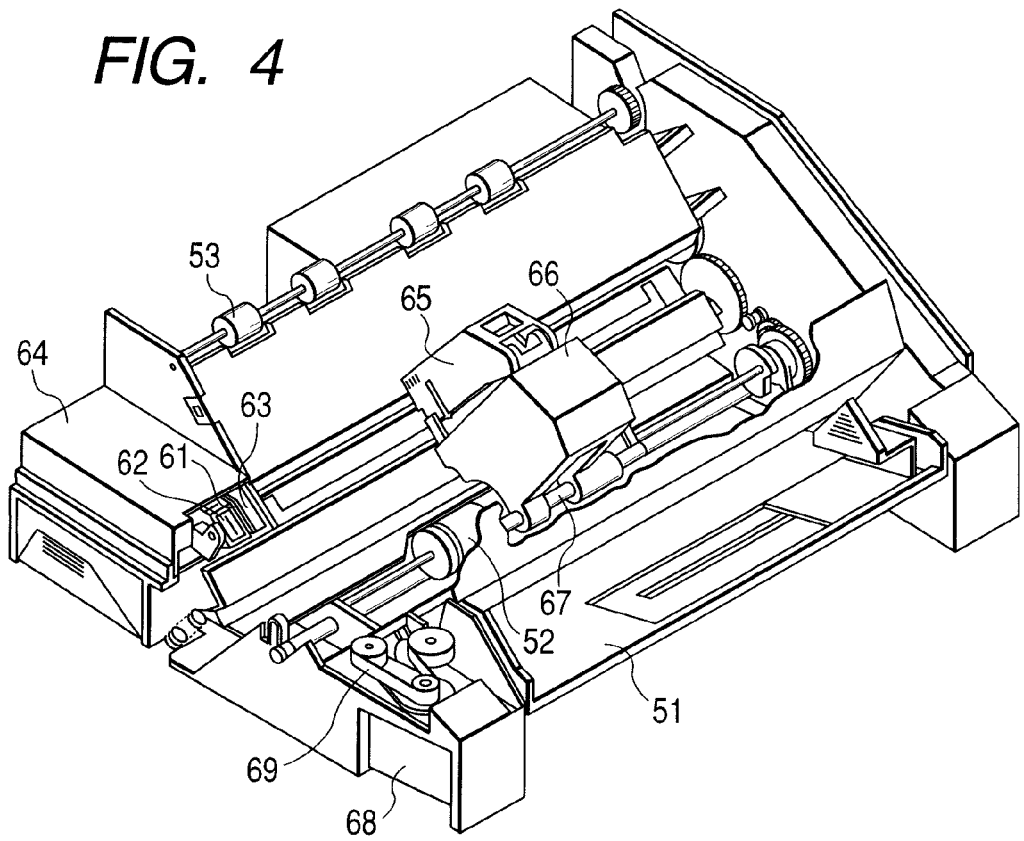
FIG. 4 is a schematic perspective view illustrating another exemplary ink-jet recording apparatus according to the present invention.

FIG. 4 illustrates another exemplary ink jet recording apparatus. In FIG. 4, one end of a blade 61 that is a wiping member is held and fixed by a blade-holding member to form a cantilever. The blade 61 is arranged at a position adjacent to a recording region in which a recording head 65 operates and, in the illustrated embodiment, is held in a form protruding into the course through which the recording head 65 is moved.

A cap 62 for the face of ejection openings of the recording head 65 is provided at a home position adjacent to the blade 61 and is so constructed that the cap moves in a direction perpendicular to a direction in which the recording head 65 is moved, and comes into contact with the face of the ink-ejection opening to cap the ejection opening face. An ink absorbing member 63 is provided adjoiningly to the blade 61 and, similar to the blade 61, held in a form protruding into the course through which the recording head 65 is moved. An ejection recovery portion 64 is constructed by the blade 61, cap 62 and ink absorbing member 63. Water, dust and/or the like are removed from the ejection opening face by the blade 61 and ink absorbing member 63. Each ink in the recording head and an ink located at an ejection opening of a reaction liquid are sucked by a pump (not illustrated) through the cap to construct a recovery system unit for recovering the ejection performance of the recording head for the inks or the inks and reaction liquid.

The recording head 65 has an ejection-energy-generating unit and serves to eject inks on a recording medium set in an opposing relation to the ejection opening face provided with the ejection openings to conduct recording. A carriage 66 mounts the recording head 65 thereon to move the recording head 65. The carriage 66 is slidably interlocked with a guide shaft 67 and is connected (not illustrated) at its part to a belt 69 driven by a motor 68. Thus, the carriage 66 can be moved along the guide shaft 67 and hence, the recording head 65 can be moved from a recording region to a region adjacent thereto. The recording medium is inserted from a paper feed part 51 and fed by paper feed rollers 52 driven by a motor (not illustrated).

With such a construction, the recording medium is fed to the position opposite to the ejection opening face of the recording head 65, and discharged from a paper discharge section provided with paper discharge rollers 53 with the progress of recording. In the above construction, the cap 62 in the ejection recovery portion 64 is receded from the path of motion of the recording head 65 when the recording head 65 is returned to its home position after completion of recording by the recording head 65, and the blade 61 remains protruded into the path of motion. As a result, the ejection opening face of the recording head 65 is wiped. Incidentally, when the cap 62 comes into contact with the ejection opening face of the recording head 65 to cap the opening face, the cap 62 is moved so as to protrude into the path of motion of the recording head 65. When the recording head 65 is moved from its home position to the position at which recording is started, the cap 62 and blade 61 are at the same positions as the positions for the wiping as described above. As a result, the ejection opening face of the recording head 65 is also wiped at the time of this movement.

The above movement of the recording head 65 to its home position is conducted not only when the recording is completed or the recording head 65 is recovered for ejection, but also when the recording head 65 is moved between recording regions for the purpose of recording, during which the recording head is moved to the home position adjacent to each recording region at given intervals, where the ejection opening face is wiped in accordance with this movement.

(Ink Properties: Ink Jet Ejection Properties and Penetrability into Recording Medium)

The ink set according to the present invention is particularly suitable for use in ink jet recording. Ink-jet recording methods include a recording method in which mechanical energy is caused to act on an ink to eject droplets of the ink, and a recording method in which thermal energy is applied to an ink to eject droplets of the ink by bubbling of the ink. Not only the ink according to the present invention, but also the reaction liquid may be used in these recording methods. In such a case, the reaction liquid and ink of the constitution according to the present invention are favorably adjusted so as to have such properties that they can be ejected from an ink jet head. From the viewpoint of ejectability from the ink jet head, these liquids favorably have, for example, a viscosity of 1 mPa·s or more, and 15 mPa·s or less, more favorably 5 mPa·s or less, and have a surface tension of 25 mN/m (dyn/cm) or more, and 50 mN/m (dyn/cm) or less.

The reaction liquid according to the present invention is required to react with only a specific ink on a recording medium such as paper. Therefore, the surface tension of the reaction liquid is favorably higher than the surface tension of an ink to be an object for unstabilization by the reaction liquid but lies within such a range that it can be ejected from the ink jet head, so that the reaction liquid does not blur another place than a recording area for the specific ink.

(Ink Cartridge)

Figure 5:
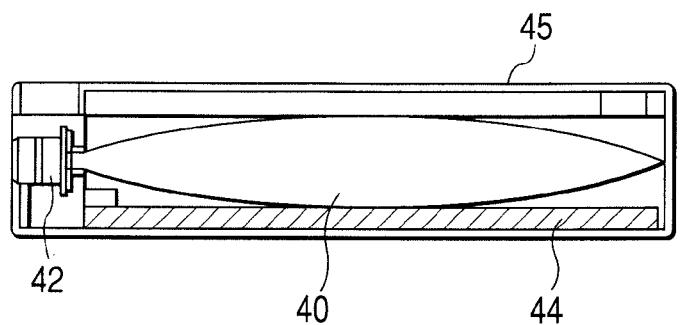
FIG. 5 is a longitudinal sectional view of an exemplary ink cartridge.

FIG. 5 illustrates an exemplary cartridge 45 in which an ink or reaction liquid to be fed through a member for feeding the ink or reaction liquid to a recording head, for example, a tube is stored. Here, the cartridge is equipped with a storage portion 40 storing the ink or reaction liquid to be fed, as exemplified by a bag. One end thereof is provided with a stopper 42 made of rubber. A needle (not illustrated) may be inserted into this stopper 42 so that the ink or reaction liquid in the bag 40 can be fed to the recording head. The cartridge is also equipped with an absorbing member 44 for receiving a waste ink or reaction liquid.

Figure 6:
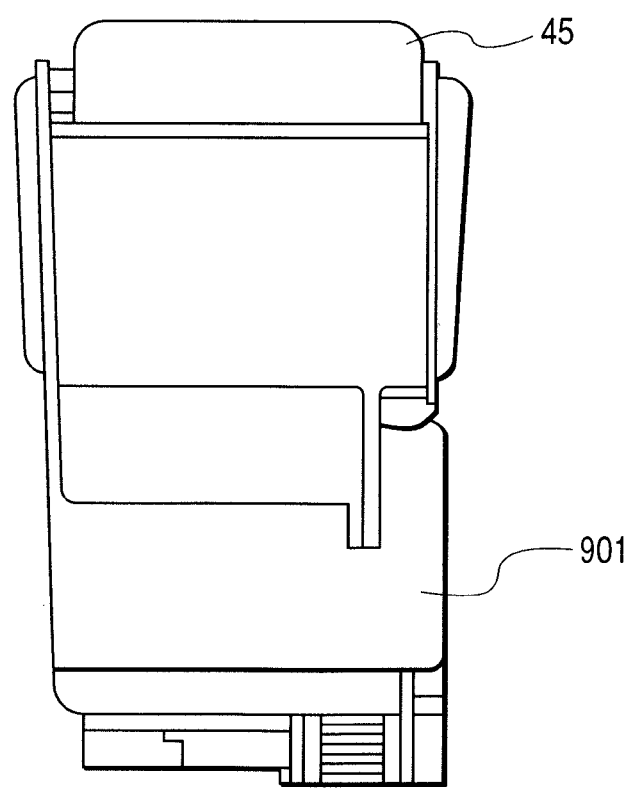
FIG. 6 is a schematic plan view illustrating a state that the ink cartridge according to an embodiment of the present invention has been installed in a recording head.

It is favorable that the storage portion 40 is such that its surface with which the ink or reaction liquid comes into contact is formed of a polyolefin, in particular, polyethylene. Such a cartridge is so constructed that the cartridge is detachably installed in a recording head 901, from which the ink or reaction liquid is ejected, as illustrated in, for example, FIG. 6, and that the ink or reaction liquid is fed to the recording head 901 when the cartridge 45 is installed in the recording head 901.

EXAMPLES

The present invention will hereinafter be described more specifically by the following Examples and Comparative Examples. However, the present invention is not limited by these examples unless going beyond the gist of the present invention. Incidentally, all designations of "part" or "parts" and "%" as will be used in the following examples mean part or parts by mass and % by mass unless expressly noted. A reaction liquid and inks were first prepared in the following manner. Precipitation values of respective pigments to the reaction liquid are shown in Table 1.

[Preparation of Reaction Liquid]

(Reaction Liquid 1)

The following components were mixed and thoroughly stirred into a solution. The resultant solution was then filtered under pressure through a microfilter (product of Fuji Photo Film Co., Ltd.) having a pore size of 0.2 μm, thereby preparing Reaction Liquid 1.

| | |
|---|---|
| Calcium nitrate (tetrahydrate) | 18 parts |
| Trimethylolpropane | 6 parts |
| Glycerol | 5 parts |
| Diethylene glycol | 5 parts |
| Acetylene glycol ethylene oxide adduct (trade name: Acetylenol EH) | 1 part |
| Water | 65 parts. |

Incidentally, the Ka value of Reaction Liquid 1 to PPC paper (product of Canon Inc.) was 3.0

[Preparation of Inks]

(Magenta Pigment Dispersion M1)

Ten parts of a pigment (C.I. Pigment Red 122), 20 parts of an anionic polymer P-1 (styrene/acrylic acid copolymer; acid value: 200, an aqueous solution having a solid content of 10%, neutralizing agent: potassium hydroxide) and 70 parts of pure water were mixed. A batch type vertical sand mill (manufactured by AIMEX Co.) was charged with the resultant mixture and 150 parts of zirconia beads having a diameter of 0.3 mm to conduct a dispersing treatment for 5 hours while cooling with water. The thus-obtained dispersion was subjected to a centrifugal separator to remove coarse particles, thereby obtaining Pigment Dispersion M1 having a solid content of 12% and a weight average particle diameter of 125 nm as a final product. The precipitation value of an aqueous dispersion prepared by adding water to this dispersion so as to give a solid content of 3% to Reaction Liquid 1 was 0.3 as calculated out by the above-described method for determining reactivity.

(Magenta Pigment Dispersion M2)

Ten parts of a pigment (C.I. Pigment Red 122), 20 parts of an anionic polymer P-2 (styrene/acrylic acid copolymer; acid value: 300, an aqueous solution having a solid content of 10%, neutralizing agent: potassium hydroxide) and 70 parts of pure water were mixed. A batch type vertical sand mill (manufactured by AIMEX Co.) was charged with the resultant mixture and 150 parts of zirconia beads having a diameter of 0.3 mm to conduct a dispersing treatment for 5 hours while cooling with water. The thus-obtained dispersion was subjected to a centrifugal separator to remove coarse particles, thereby obtaining Pigment Dispersion M2 having a solid content of 12% and a weight average particle diameter of 125 nm as a final product. The precipitation value of an aqueous dispersion prepared by adding water to this dispersion so as to give a solid content of 3% to Reaction Liquid 1 as determined in the same manner as described above was 0.6.

(Magenta Pigment Dispersion M3)

Ten parts of a pigment (C.I. Pigment Red 202), 20 parts of an anionic polymer P-1 (styrene/acrylic acid copolymer; acid value: 200, an aqueous solution having a solid content of 10%, neutralizing agent: potassium hydroxide) and 70 parts of pure water were mixed. A batch type vertical sand mill (manufactured by AIMEX Co.) was charged with the resultant mixture and 150 parts of zirconia beads having a diameter of 0.3 mm to conduct a dispersing treatment for 5 hours while cooling with water. The thus-obtained dispersion was subjected to a centrifugal separator to remove coarse particles, thereby obtaining Pigment Dispersion M3 having a solid content of 12% and a weight average particle diameter of 130 nm as a final product. The precipitation value of an aqueous dispersion prepared by adding water to this dispersion so as to give a solid content of 3% to Reaction Liquid 1 as determined in the same manner as described above was 0.3.

(Magenta Pigment Dispersion M4)

Ten parts of a pigment (C.I. Pigment Red 202), 20 parts of an anionic polymer P-3 (styrene/acrylic acid copolymer; acid value: 250, an aqueous solution having a solid content of 10%, neutralizing agent: potassium hydroxide) and 70 parts of pure water were mixed. A batch type vertical sand mill (manufactured by AIMEX Co.) was charged with the resultant mixture and 150 parts of zirconia beads having a diameter of 0.3 mm to conduct a dispersing treatment for 5 hours while cooling with water. The thus-obtained dispersion was subjected to a centrifugal separator to remove coarse particles, thereby obtaining Pigment Dispersion M4 having a solid content of 12% and a weight average particle diameter of 130 nm as a final product. The precipitation value of an aqueous dispersion prepared by adding water to this dispersion so as to give a solid content of 3% to Reaction Liquid 1 as determined in the same manner as described above was 0.5.

(Magenta Pigment Dispersion M5)

Ten parts of a pigment (C.I. Pigment Red 202), 30 parts of an anionic polymer P-2 (styrene/acrylic acid copolymer; acid value: 300, an aqueous solution having a solid content of 10%, neutralizing agent: potassium hydroxide) and 60 parts of pure water were mixed. A batch type vertical sand mill (manufactured by AIMEX Co.) was charged with the resultant mixture and 150 parts of zirconia beads having a diameter of 0.3 mm to conduct a dispersing treatment for 5 hours while cooling with water. The thus-obtained dispersion was subjected to a centrifugal separator to remove coarse particles, thereby obtaining Pigment Dispersion M5 having a solid content of 12% and a weight average particle diameter of 135 nm as a final product. The precipitation value of an aqueous dispersion prepared by adding water to this dispersion so as to give a solid content of 3% to Reaction Liquid 1 as determined in the same manner as described above was 0.6.

(Magenta Pigment Dispersion M6)

To a solution obtained by dissolving 5 g of concentrated hydrochloric acid in 5.5 g of water, was added 1.5 g of 4-aminophthalic acid while cooling to 5° C. The resulting mixture was subjected to stirring with the container containing this mixture put into an ice bath, so that the temperature of the mixture was constantly held lower than 10° C. To this mixture, was added a solution obtained by dissolving 1.8 g of sodium nitrite in 9 g of water of 5° C. followed by additional stirring for 15 minutes. Thereafter, 5 g of C.I. Pigment Red 122 was added to the resultant mixture under stirring followed by additional stirring for 15 minutes. The thus-obtained slurry was filtered with a filter paper (trade name: Standard Filter Paper No. 2, product of ADVATEC Co.), and then the resultant particles were sufficiently rinsed with water followed by drying in an oven at 110° C., thereby preparing a self-dispersion type magenta pigment A. To the thus-obtained self-dispersion type magenta pigment A, water was added to obtain Pigment Dispersion M6 of the self-dispersion type magenta pigment having a solid content of about 12% and a weight average particle diameter of 98 nm. The precipitation value of an aqueous dispersion prepared by adding water to this dispersion so as to give a solid content of 3% to Reaction Liquid 1 as determined in the same manner as described above was 0.3.

(Magenta Pigment Dispersion M7)

To a solution obtained by dissolving 5 g of concentrated hydrochloric acid in 5.5 g of water, was added 2.5 g of 4-aminophthalic acid while cooling to 5° C. The resulting mixture was subjected to stirring with the container containing this mixture put into an ice bath, so that the temperature of the mixture was constantly held lower than 10° C. To this mixture, was added a solution obtained by dissolving 1.8 g of sodium nitrite in 9 g of water of 5° C. followed by additional stirring for 15 minutes. Thereafter, 5 g of C.I. Pigment Red 202 was added to the resultant mixture under stirring followed by additional stirring for 15 minutes. The thus-obtained slurry was filtered with a filter paper (trade name: Standard Filter Paper No. 2, product of ADVATEC Co.), and then the resultant particles were sufficiently rinsed with water followed by drying in an oven at 110° C., thereby preparing a self-dispersion type magenta pigment B. To the thus-obtained self-dispersion type magenta pigment B, water was added to obtain Pigment Dispersion M7 of the self-dispersion type magenta pigment having a solid content of about 12% and a weight average particle diameter of 102 nm. The precipitation value of an aqueous dispersion prepared by adding water to this dispersion so as to give a solid content of 3% to Reaction Liquid 1 as determined in the same manner as described above was 0.4.

TABLE 1

| Coloring material | Precipitation value |
| --- | --- |
| M1 | 0.3 |
| M2 | 0.6 |
| M3 | 0.3 |
| M4 | 0.5 |
| M5 | 0.6 |
| M6 | 0.3 |
| M7 | 0.4 |

(Composition of Magenta Ink 1)

| | |
| --- | --- |
| Pigment Dispersion M2 | 20 parts |
| Pigment Dispersion M4 | 20 parts |
| Glycerol | 9 parts |
| Diethylene glycol | 6 parts |
| Acetylene glycol ethylene oxide adduct (trade name: Acetylenol EH) | 1 part |
| Water | 44 parts. |

(Composition of Magenta Ink 2)

| | |
| --- | --- |
| Pigment Dispersion M1 | 20 parts |
| Pigment Dispersion M4 | 20 parts |
| Glycerol | 9 parts |
| Diethylene glycol | 6 parts |
| Acetylene glycol ethylene oxide adduct (trade name: Acetylenol EH) | 1 part |
| Water | 44 parts. |

(Composition of Magenta Ink 3)

| | |
| --- | --- |
| Pigment Dispersion M1 | 20 parts |
| Pigment Dispersion M3 | 20 parts |
| Glycerol | 9 parts |
| Diethylene glycol | 6 parts |

-continued

| | |
|---|---|
| Acetylene glycol ethylene oxide adduct (trade name: Acetylenol EH) | 1 part |
| Water | 44 parts. |

(Composition of Magenta Ink 4)

| | |
|---|---|
| Pigment Dispersion M1 | 20 parts |
| Pigment Dispersion M4 | 10 parts |
| Glycerol | 9 parts |
| Diethylene glycol | 6 parts |
| Acetylene glycol ethylene oxide adduct (trade name: Acetylenol EH) | 1 part |
| Water | 54 parts. |

(Composition of Magenta Ink 5)

| | |
|---|---|
| Pigment Dispersion M1 | 20 parts |
| Pigment Dispersion M5 | 20 parts |
| Glycerol | 9 parts |
| Diethylene glycol | 6 parts |
| Acetylene glycol ethylene oxide adduct (trade name: Acetylenol EH) | 1 part |
| Water | 44 parts. |

(Composition of Magenta Ink 6)

| | |
|---|---|
| Pigment Dispersion M1 | 20 parts |
| Pigment Dispersion M5 | 10 parts |
| Glycerol | 9 parts |
| Diethylene glycol | 6 parts |
| Acetylene glycol ethylene oxide adduct (trade name: Acetylenol EH) | 1 part |
| Water | 54 parts. |

(Composition of Magenta Ink 7)

| | |
|---|---|
| Pigment Dispersion M6 | 20 parts |
| Pigment Dispersion M7 | 20 parts |
| Glycerol | 9 parts |
| Diethylene glycol | 6 parts |
| Acetylene glycol ethylene oxide adduct (trade name: Acetylenol EH) | 1 part |
| Water | 44 parts. |

Example 1

Reaction Liquid 1 and Magenta Ink 1 prepared above were combined to prepare an ink set, thereby printing an image for evaluation by means of an ink jet recording apparatus (trade name: BJS700; manufactured by Canon Inc.). This ink jet recording apparatus has an On-Demand type multi-recording head which ejects an ink by applying thermal energy in response to recording signals to the ink. Incidentally, the reaction liquid was applied to a site to which the ink is to be applied and surroundings thereof prior to the application of the ink. The amount of the reaction liquid applied to the recording medium was controlled to 3.0 g/m².

Example 2

Reaction Liquid 1 and Magenta Ink 2 prepared above were combined to prepare an ink set, thereby printing an image for evaluation by means of the ink jet recording apparatus (trade name: BJS700; manufactured by Canon Inc.). Incidentally, the reaction liquid was applied to a site to which the ink is to be applied and surroundings thereof prior to the application of the ink. The amount of the reaction liquid applied to the recording medium was controlled to 3.0 g/m².

Example 3

Reaction Liquid 1 and Magenta Ink 3 prepared above were combined to prepare an ink set, thereby printing an image for evaluation by means of the ink jet recording apparatus (trade name: BJS700; manufactured by Canon Inc.). Incidentally, the reaction liquid was applied to a site to which the ink is to be applied and surroundings thereof prior to the application of the ink. The amount of the reaction liquid applied to the recording medium was controlled to 3.0 g/m².

Example 4

Reaction Liquid 1 and Magenta Ink 4 prepared above were combined to prepare an ink set, thereby printing an image for evaluation by means of the ink jet recording apparatus (trade name: BJS700; manufactured by Canon Inc.). Incidentally, the reaction liquid was applied to a site to which the ink is to be applied and surroundings thereof prior to the application of the ink. The amount of the reaction liquid applied to the recording medium was controlled to 3.0 g/m².

Example 5

Reaction Liquid 1 and Magenta Ink 7 prepared above were combined to prepare an ink set, thereby printing an image for evaluation by means of the ink jet recording apparatus (trade name: BJS700; manufactured by Canon Inc.). Incidentally, the reaction liquid was applied to a site to which the ink is to be applied and surroundings thereof prior to the application of the ink. The amount of the reaction liquid applied to the recording medium was controlled to 3.0 g/m².

Comparative Example 1

Reaction Liquid 1 and Magenta Ink 5 prepared above were combined to prepare an ink set, thereby printing an image for evaluation by means of the ink jet recording apparatus (trade name: BJS700; manufactured by Canon Inc.). Incidentally, the reaction liquid was applied to a site to which the ink is to be applied and surroundings thereof prior to the application of the ink. The amount of the reaction liquid applied to the recording medium was controlled to 3.0 g/m².

Comparative Example 2

Reaction Liquid 1 and Magenta Ink 6 prepared above were combined to prepare an ink set, thereby printing an image for evaluation by means of the ink jet recording apparatus (trade name: BJS700; manufactured by Canon Inc.). Incidentally, the reaction liquid was applied to a site to which the ink is to be applied and surroundings thereof prior to the application of the ink. The amount of the reaction liquid applied to the recording medium was controlled to 3.0 g/m².

The ink sets of Examples and Comparative Examples were used to make evaluation according to the following methods. Evaluation items are shown below. The following plain paper sheets A, B, C and D for copying were used as recording media:

A: PPC paper Office Planner, product of Canon Inc.
B: PPC paper 4024, product of Xerox Co., Ltd.
C: PPC paper PROVER BOND, product of Fox River Co.

D: Three kinds of paper of commercially available paper for copying, bond paper, and regenerated paper for Canon PPC paper (product of Noididora Co.).

[Evaluation]

<Color Unevenness>

A 2-cm×2-cm square solid image (100% duty) was printed to visually observe whether there were recorded portions different in density or not. Upon evaluation, the observation was conducted 30 cm away from the print to make a comparison according to the following standard. The results are shown in Table 2.

Good: An uneven portion was not observed at all on the printed area, and solid evenness was excellent Fair: In some of the papers, there were portions where a dense portion and a light portion coexisted Poor: In all of the papers, there were considerable portions where a dense portion and a light portion coexisted.

<Strike-Through Characteristic>

A 2-cm×2-cm square solid image (100% duty) was printed to visually observe the degree of strike-through of the ink from the back side of the print, thereby making evaluation as to the strike-through characteristic according to the following standard. The results are shown in Table 2.

Good: No strike-through was observed
Fair: Strike-through was partially observed
Poor: Strike-through was considerably observed.

TABLE 2

| | Evaluation results | | | | | | |
|---|---|---|---|---|---|---|---|
| | Ex. 1 | Ex. 2 | Ex. 3 | Ex. 4 | Ex. 5 | Comp. Ex. 1 | Comp. Ex. 2 |
| Color unevenness of image | Good | Fair | Good | Good | Good | Poor | Poor |
| Strike-through characteristic | Fair | Good | Good | Good | Good | Fair | Good |

Concerning the ink sets of Examples shown in Table 2, the precipitation values of the respective pigments are comparable to each other. In the images printed with these ink sets of these Examples, no portion where color unevenness occurred was present, and a portion where the ink permeated up to the back surface of the recording medium was not present at all, or scarcely present. On the other hand, for the ink sets of the Comparative Examples, the difference in precipitation value between respective pigments was more than 0.2. As a result, a portion where color unevenness occurred was considerably present in the image printed with the ink sets of the Comparative Examples.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-342113, filed Dec. 20, 2006, which is hereby incorporated by reference herein in its entirety.

What is claimed is:

1. An ink set comprising:
an aqueous ink comprising water, a water-soluble organic solvent, and at least two pigments, the at least two pigments being different from each other; and
a reaction liquid containing a reactive component that reacts with the aqueous ink to cause aggregation or gelation of the aqueous ink,
wherein the at least two pigments have a difference in precipitation value to the reaction liquid of 0.2 or less,
wherein the precipitation values of all the pigments contained in the aqueous ink to the reaction liquid are 0.5 or less, the at least two pigments are each independently any one of a self-dispersion type pigment, a resin dispersion pigment comprising a pigment and a dispersant, and a microcapsule type pigment, and the precipitation value is determined by adding dropwise 0.25 g of a 3% aqueous solution of the at least two pigments into a container having an inner diameter of 10 mm and containing 5 g of the reaction liquid diluted to 1/100 by pure water followed by being left in a stationary state for 60 minutes, and calculating the proportion of the height of a precipitate to the height from a bottom of the container to the air-liquid interface.

2. The ink set according to claim 1, wherein the content of a pigment having the highest precipitation value to the reaction liquid among all the pigments contained in the aqueous ink is the lowest.

3. The ink set according to claim 1, wherein the reactive component is at least one selected from polyvalent metal ions and salts thereof.

4. An ink jet recording method comprising applying an aqueous ink and a reaction liquid to a recording medium to conduct recording, wherein the aqueous ink according to claim 1 is used as the aqueous ink, and at least application of the aqueous ink to the recording medium is conducted by an ink jet recording system.

5. The ink jet recording method according to claim 4, wherein the reaction liquid is applied prior to the application of the aqueous ink.

6. An ink cartridge storing the aqueous ink according to claim 1.

7. An ink jet recording apparatus comprising the ink cartridge according to claim 6 and an ink jet head for ejecting the aqueous ink stored in the ink cartridge.

8. The ink set according to claim 1, wherein both of the at least two pigments are either one of the resin dispersion pigment and the microcapsule type pigment, and
wherein a difference in acid value between resins dispersing the at least two pigments is 50 (mg KOH/g) or less.

9. The ink set according to claim 8, wherein both acid values of the resins dispersing the at least two pigments are 300 (mg KOH/g) or less.

10. The ink set according to claim 8, wherein both weight average molecular weights of the resins dispersing the at least two pigments are 1,000 or more and 30,000 or less.

11. The ink set according to claim 1, wherein both of the at least two pigments are the self-dispersion type pigment, and
wherein a difference in surface functional group density between the at least two pigments is 0.6 ($\mu mol/m^2$) or less.

* * * * *